United States Patent Office 2,883,129
Patented Apr. 21, 1959

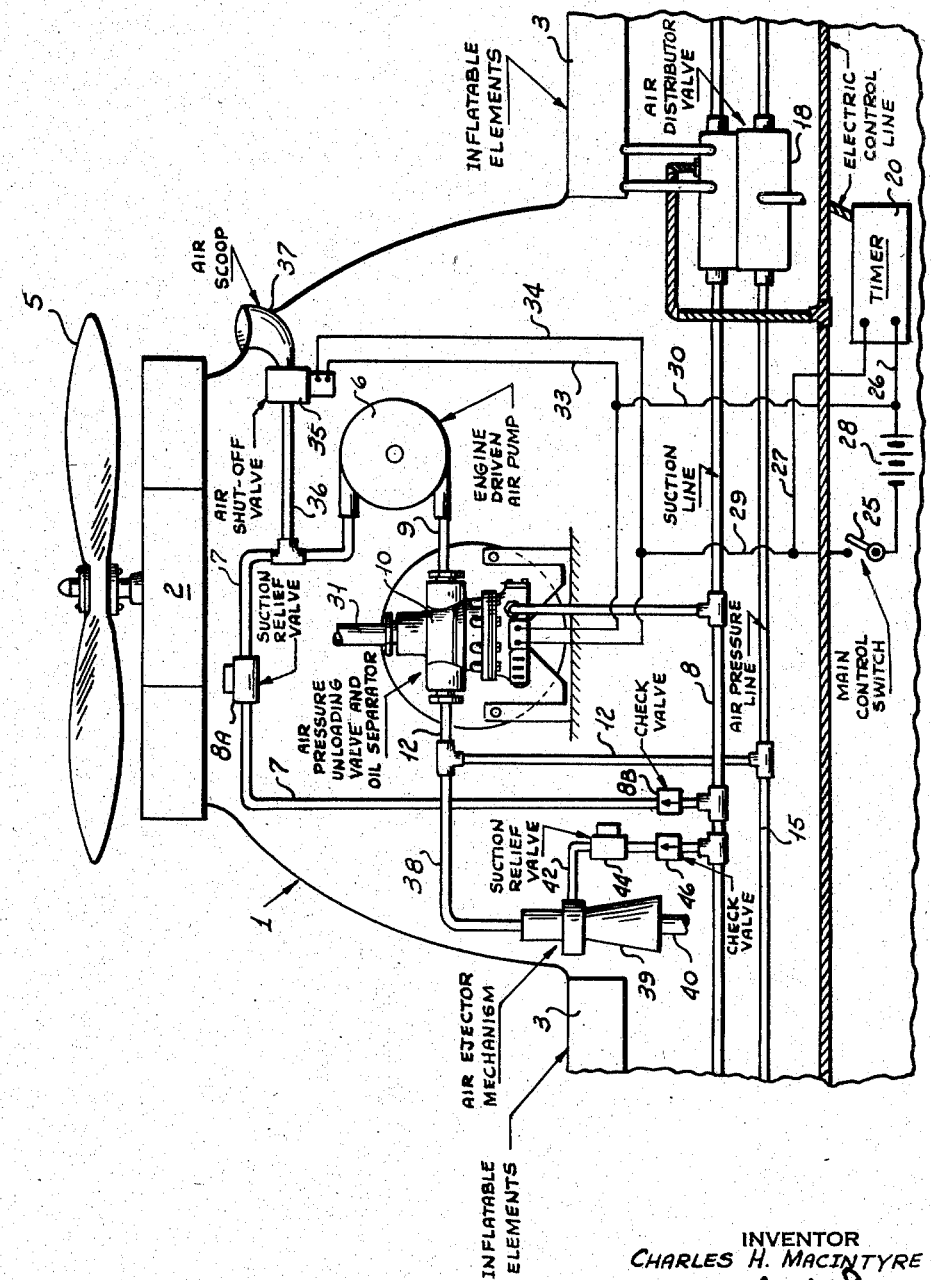

2,883,129

PRESSURE AND VACUUM SYSTEM FOR OPERATING INFLATABLE ELEMENTS

Charles H. MacIntyre, Dumont, N.J., assignor to Bendix Aviation Corporation, Teterboro, N.J., a corporation of Delaware Application April 19, 1955, Serial No. 502,372

3 Claims. (Cl. 244—134)

The present invention relates to a control system for inflatable elements for an ice eliminating system such as disclosed in Lawrence U.S. Patent No. 2,663,522 granted December 22, 1953, and to a control system which may be equally applicable for controlling the inflation and deflation of inflatable shoes or boots to vary the contour of the leading edge of the wing of an aircraft, as disclosed in copending application Serial No. 475,398 filed December 15, 1954 by Charles H. MacIntyre. The aforenoted patent and application have been assigned to Bendix Aviation Corporation assignee of the present application. More particularly, the present invention relates to improvements in the pressure system for inflating such elements and in the vacuum system for holding such elements down in a deflated condition.

In an inflatable ice eliminating system, such as disclosed and claimed in the Lawrence U.S. Patent No. 2,663,522, it has heretofore been the practice to operate the pump for supplying the operating pressure for the system under a combined suction and pressure load, as shown therein. The suction which may range between 4 and 7 in. Hg is used for holding the inflatable boots of the system down and also for instrument operation. Moreover, the air outlet pressure from the supply pump in such an ice eliminating system may range between 8 and 10 p.s.i. and is used for the inflation of the boots of the system.

However, in aircraft employing more recently developed high pressure inflatable elements or boots which operate at between 15 and 30 p.s.i., it has been found necessary to remove the suction load from the pump which is supplying pressure to the inflatable ice eliminating system. Also, in some of the lower 8 p.s.i. systems which require operation of the aircraft at high altitudes of, for example, above 20,000 feet; this is also necessary. This has heretofore necessitated the use of a separate pump from the pressure pump for providing a negative pressure to hold down the inflatable elements or boots and for instrument operation.

The main reason for requiring removal of the suction load from the pressure pump in the system disclosed in the Lawrence U.S. Patent No. 2,663,522 has been the high compression ratio which is encountered at high altitudes and under the high pressure conditions required for operation of the high pressure boots.

An object of the present invention is to provide novel means whereby air pumps needed for such new type inflatable equipment may under certain conditions be operated under a pressure load only and under other conditions under a suction load only but in neither case under combined suction and pressure loads as was customary with lower pressure systems.

Another object of the invention is to provide novel means whereby the pump or pumps for operating the inflatable elements may operate with a pressure load only during the normal periods of inflation of the elements and with a suction load only during such times as the inflatable elements are not in normal operation and are held down under suction.

Another object of the invention is to provide novel means whereby during the cycle of operation of the inflatable elements the inlet of the pressure supply pump may be selectively connected to an auxiliary source of air under pressure, such as a bleed from a pressurized cabin or a scoop or blast air inlet, so that such auxiliary supply of air pressure may serve to supplement the air supply and actuate suitable means to prevent the inlet side of the pump from providing a source of negative pressure for holding the inflatable elements in a deflated condition and other means whereby the outlet of the pump may be utilized to both provide a source of suction for selectively holding the elements in a deflated condition and a source of pressure for selectively inflating such elements.

Another object of the invention is to provide novel means for operatively connecting the inlet side of the supply pump to an auxiliary supply of pressurized air and for bleeding air under pressure from the outlet of the pump to operate suitable means for providing an auxiliary source of negative pressure to hold certain of the inflatable elements or boots in a deflated condition during the inflation of other of said several elements by controlled air from the outlet of the pressure pump.

The above and other objects and features of the invention will appear more fully hereinafter from a consideration of the following description taken in connection with the accompanying drawing wherein one embodiment of the invention is illustrated by way of example.

The drawing is a fragmentary plan view of an aircraft showing diagrammatically the manner in which the novel control system is operatively connected.

Referring to the drawing, there is shown an aircraft indicated by the numeral 1 having an engine 2 and inflatable elements or boots 3 mounted along the leading edge of the plane and of a type such as disclosed in U.S. Patent No. 2,663,522 granted December 22, 1953 to Donald M. Lawrence; and in U.S. Patent No. 2,515,519 granted July 18, 1950, to Donald M. Lawrence et al. and which patents have been assigned to Bendix Aviation Corporation.

The engine 2 is arranged so as to drive an aircraft propeller 5. An air pump 6 is also driven in a conventional manner by the engine 2 and has provided a suction conduit 7 leading to the main suction line 8 through a suitable suction relief valve 8A and check valve 8B, as shown.

An air pressure line 9 leads from the pump 6 to the inlet of a pressure unloading valve or device indicated generally by the numeral 10 and which may be of the type disclosed and claimed in the aforementioned U.S. Patent No. 2,663,522. During the passage of the air through the device 10, any particles of oil which may enter the air from the pump 6 or other source, is separated and the air is filtered of dirt and other extraneous matter by an oil separator and air filter provided in the device 10, as disclosed and claimed in the U.S. Patent No. 2,663,522. The air flow thus processed, is conducted through the conduit 12 to the air pressure line 15.

The suction and air pressure lines 8 and 15 lead to suitable air distributor valves 18 which are electrically controlled by a timer indicated generally by the numeral 20 so as to operate the inflatable boot elements 3. A plurality of such distributor valves are preferably provided of a type such as disclosed and claimed in the aforenoted U.S. Patent No. 2,515,519. The timer 20 includes, as shown schematically, an electronic timer which may be of the type disclosed and claimed in U.S. Patent No. 2,444,210 granted June 29, 1948, to John W. Lauricella and assigned to Bendix Aviation Corporation. The operation of the timer is described in detail in the U.S. Patent No. 2,444,210.

A manually operable switch 25 is arranged to control the operation of the timer 20, as will be readily apparent through electrical conductors 26 and 27 leading from a source of electrical energy 28, while operation of the unloading valve mechanism of the device 10 is controlled by a solenoid energized upon the closing of switch 25 through electrical conductors 29—30.

In the aforenoted control system, as explained in the U.S. Patent No. 2,663,522, the closing of the switch 25 simultaneously closes both circuits 26—27 and 29—30 to effect operation of the timer 20, as well as cause the unloading valve of the device 10 to direct air under pressure through line 12 to the pressure line 15 so long as the switch 25 remains closed. In such system, when switch 25 is opened and operation of the inflatable ice eliminating system terminated the unloading valve of the device 10 closes the conduit 12 and directs the air flow from the conduit 9 to an overboard dump 31, as explained in the U.S. Patent No. 2,663,522.

Thus in the present invention the circuit 29—30 controls a corresponding unloading valve in the device 10 through a solenoid, as shown and explained in U.S. Patent No. 2,663,522. The unloading valve and control solenoid of the device 10 may be of the type disclosed and claimed in the last mentioned patent and in which the unloading valve is arranged to close the passage 12 and open the passage 31 to the passage 9 upon deenergization of the control solenoid, and close the passage 31 to the passage 9 and open the passage 12 to the passage 9 upon energization of the control solenoid of the device 10.

However, the switch 25, in addition to controlling the energization of the control circuit 29—30, also controls energization of a control circuit 33—34 leading from the control lines 29 and 30 respectively, to a control solenoid of a shut-off valve indicated by the numeral 35. The solenoid controlled valve 35 is of a conventional type and is arranged upon deenergization to normally close the conduit 36 leading to the suction line 7 from an air scoop 37 or other source of blast air or air under pressure, such as a pressurized cabin. Upon the closing of switch 25 effecting energization of the control solenoid for the shut-off valve 35, the valve 35 is actuated to an open position, whereupon an auxilliary supply of air under pressure is supplied through the conduit 36 to the inlet conduit 7 of the pump 6.

Simultaneously with the energization of the control solenoid for the valve 35, the solenoid controlling the operation of the device 10 is likewise energized, connecting line 9 to the conduit 12. Teed from the line 12 is a conduit 38 leading to an air ejector mechanism 39 of a type such as shown in detail in copending application Serial No. 321,396 (now U.S. Patent No. 2,753,138) filed November 19, 1952, by Charles H. MacIntyre and assigned to Bendix Aviation Corporation.

The said ejector mechanism 39 through the conduit 38 bleeds air from the outlet conduit 12 under pressure of the pump 6. The air thus bled through conduit 38 flows at high velocity through the ejector mechanism 39 to an outlet conduit 40. The outlet conduit 40 may be exhausted directly to atmosphere or the conduit 40 may be operably connected to suitable air driven instruments of the aircraft requiring a constant flow of air for operation, such as an air driven gyro.

As explained in the aforenoted copending application Serial No. 321,396 (now U.S. Patent No. 2,753,138), the air ejector mechanism 39 includes a venturi nozzle having a low pressure side from which there leads a suction conduit 42 connected to the main suction line 8 through a suction relief valve 44 and suction check valve 46.

Operation

It will be seen from the foregoing arrangement that inasmuch as the inflating pressure is only needed during the inflation of the several inflatable elements or boots of the ice eliminating system or contour varying device, the control system is such that the supply pump 6 operates as a vacuum pump holding the inflatable elements down during that period of time when the system is not in operation and inflation of the several elements is not required. However, during the inflating cycle of operation, the switch 25 is closed and the solenoid controlled valve 10 causes pressure in the lines 12 and 15 to build up to the desired pressure required for operation of the several inflatable elements or boots. Also, closing of the switch 25 energizes the control solenoid of the normally closed shut-off valve 35 causing the valve 35 to open conduit 36 and direct an auxiliary supply of air under pressure from the air scoop or other source of air under pressure into the inlet conduit 7 of the air pump 6. This supply of air under pressure to the conduit 7 causes the check valve 8B to close so that the pump 6 no longer draws air under suction from the suction line 8 and the pump 6 serves to supply a fluid medium under relatively high pressure through the device 10 to the conduit 12.

Moreover, from the outlet side of the pressure regulating valve 10 the air under pressure is bled through conduit 38 to the ejector mechanism 39 through which it is directed and then passed overboard through conduit 40. Further, the air flow through the mechanism 39 effects through line 42 a negative pressure which is applied through the suction relief valve 44 and check valve 46 to the main suction line 8 so as to selectively hold the inflatable elements in a deflatable condition under control of the air distributing valves 18. The check valve 46 in line 42 serves to prevent a back flow of air through the line 42 to the suction line 8 upon deenergization of the respective control solenoids in the device 10 and shut-off valve 35.

When the switch 25 is open, causing the device 10 to connect conduit 9 overboard through conduit 31 and valve 35 to close conduit 36 leading from the auxiliary supply of air under pressure, the pump 6 operates as a suction source only, drawing air under negative pressure through conduit 7, and the arrangement is such that air under pressure in conduit 9 is exhausted directly to atmosphere through the conduit 31.

Although only one embodiment of the invention has been illustrated and described, various changes in the form and relative arrangement of the parts may be made to suit requirements.

What is claimed is:

1. An aircraft having a plurality of inflatable units mounted along airfoil surfaces thereof, a pump having an air inlet and an air outlet, means operatively connecting said air outlet to said units for the inflation thereof, said last mentioned means including a plurality of electrically operated air distributor valves for controlling the pressure medium from said pump, timing means for controlling said electrically operated air distributor valves so as to selectively inflate and deflate said units, an electrically operated air unloading valve so connected and constructed as to be operable in a first sense to discharge air under pressure from the outlet of said pump to atmosphere and in a second sense to direct the outlet air to said distributor valves; first conduit means including an air scoop for applying an auxiliary supply of air under pressure to the air inlet of said pump and connected thereto, an electrically operated air shut-off valve operable in one sense to close said first conduit means, operator-operative control means so constructed and connected as to simultaneously control operation of said timing means and said electrically operated unloading valve and shut-off valve, said operator-operative control means operative in a first sense to cause said shut-off valve to close said first conduit means and effect operation of the unloading valve in said first sense to discharge the pump outlet air pressure to atmosphere, second conduit means so connected to be effective upon the closing of said shut-off valve to connect the pump inlet to said distributor valves to apply therethrough a negative pressure to said units to hold the same in a deflated condition, said operator-operative control means operative in a second sense to cause operation of said timing means while simultaneously causing said shut-off valve to open said first conduit means and operation of the unloading valve in the aforesaid second sense, check valve means in said second conduit means effective upon the opening of said first conduit means to close the second conduit means and thereby the connection between said pump inlet and the air distributor valves, said unloading valve including third conduit means effective upon said unloading valve operating in said second sense to connect the air outlet from said pump to said distributor valves to cause the selective inflation of said units, an air ejector mechanism to provide a source of negative pressure, fourth conduit means for bleeding air under pressure from the third conduit means, said fourth conduit means being operatively connected to the air ejector mechanism, fifth conduit means operatively connecting the air ejector mechanism to the air distributor valves to selectively hold said units in a deflated condition, check valve means in said fifth conduit means effective upon said unloading valve operating in said first sense to close the fifth conduit means and thereby the connection between said air ejector mechanism and the air distributor valves.

2. An aircraft having a plurality of inflatable units mounted along airfoil surfaces thereof, a pump having an air inlet and an air outlet, means including an unloading valve operatively connecting said air outlet to said units for the inflation thereof, a suction line connected to said units for deflation thereof, control means including a plurality of distributor valves arranged so as to permit selective inflation and deflation of said units, said unloading valve constructed as to be operable in a first sense to discharge air under pressure from the outlet of said pump to atmosphere and in a second sense to direct the outlet air to said distributor valves, first conduit means including an air scoop and air shut-off valve for applying air under pressure to the air inlet of said pump and connected thereto, said air shut-off valve operable in one sense to close said first conduit means upon operation of the unloading valve in said first sense to discharge the pump outlet air pressure to atmosphere, said shut-off valve operable to open said first conduit means upon operation of the unloading valve in the aforesaid second sense, second conduit means effective upon the closing of said shut-off valve to connect the pump inlet to said suction line and said distributor valves to apply therethrough a negative pressure to said units to hold the same in a deflated condition only when the selective inflation and deflation of said units is completed, means in said second conduit means effective in response to the supply of air by the air scoop upon the opening of said first conduit means to close the second conduit means and thereby the connection between said pump inlet and the air distributor valves so that said pump does not provide suction when providing inflating air, said unloading valve having third conduit means so connected to be effective upon said unloading valve operating in said second sense to connect the air outlet from said pump to said distributor valves to cause the selective inflation of said units, an air ejector mechanism to provide a source of negative pressure when said pump is connected to inflate said units, fourth conduit means for bleeding air under pressure from the third conduit means when said pump provides inflating air and being operatively connected to the air ejector mechanism, fifth conduit means operatively connecting the air ejector mechanism to said suction line and said air distributor valves to selectively hold said units in a deflated condition, a check valve in said fifth conduit means effective upon said unloading valve operating in said first sense to close the fifth conduit means and thereby the connection between said air ejector mechanism and the air distributor valves.

3. The combination comprising an aircraft having air operated inflatable deicing means, pump means having an air inlet and an air outlet, first conduit means including a suction line for connecting the inlet of said pump means to said air operated means, a second conduit means for connecting the outlet of said pump means to said air operated means, an air scoop providing a source of air under pressure, a shut-off valve so connected as to be operable in a first sense to connect said source to said first conduit means and in a second sense to shut-off said source from said first conduit means, check valve means in said first conduit means permitting flow of air therein to the inlet of said pump means when said shut-off valve is closed while preventing reverse flow of air in said first conduit means to said suction line when said shut-off valve is open whereby said pump means provides suction only when said source is not connected to the inlet of said pump means, an unloading valve so connected as to be operable in a first sense to connect the outlet of said pump means to the second conduit means and in a second sense to connect said outlet of said pump means to atmosphere, control means operable in a first sense to effect operation of said shut-off valve and said unloading valve each in said first sense, said control means operable in a second sense to effect operation of said shut-off valve and unloading valve each in said second sense, an air ejector mechanism operatively connected to bleed air from the second conduit means and hence from said pump means to provide suction when said unloading valve connects said pump to said second conduit means, a third conduit means operatively connecting said air ejector mechanism to said air suction line to apply therethrough a negative pressure to said air operated means for deflation thereof, and check valve means in said third conduit means permitting flow of air therein to said air ejector mechanism while preventing reverse flow of air in said third conduit means to said suction line, said control means including air distributor valve means so constructed and connected to selectively connect said suction line and second conduit means to said air operated means for inflation and deflation when said control means is operated in its first sense.

References Cited in the file of this patent

UNITED STATES PATENTS

| | | |
|---|---|---|
| 930,989 | Richards | Aug. 10, 1909 |
| 2,168,328 | Diehl | Aug. 8, 1939 |
| 2,215,901 | Christman | Sept. 24, 1940 |
| 2,217,299 | Taylor | Oct. 8, 1940 |
| 2,327,046 | Hunter | Aug. 17, 1943 |
| 2,375,331 | Taylor | May 8, 1945 |
| 2,391,306 | Gregg | Dec. 18, 1945 |
| 2,515,519 | Lawrence et al. | July 18, 1950 |
| 2,663,522 | Lawrence | Dec. 22, 1953 |

FOREIGN PATENTS

| | | |
|---|---|---|
| 559,012 | Great Britain | Feb. 1, 1944 |